April 18, 1933.   J. T. GRIFFIN ET AL   1,904,863
DEVICE FOR FASTENING THE END OF A COILED
MEMBER TO A SUPPORTING STRUCTURE
Filed Dec. 6, 1929
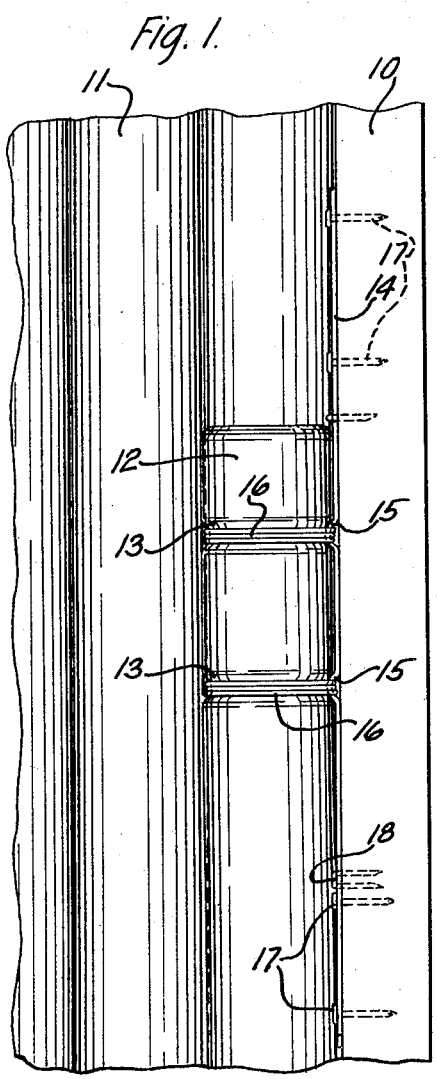
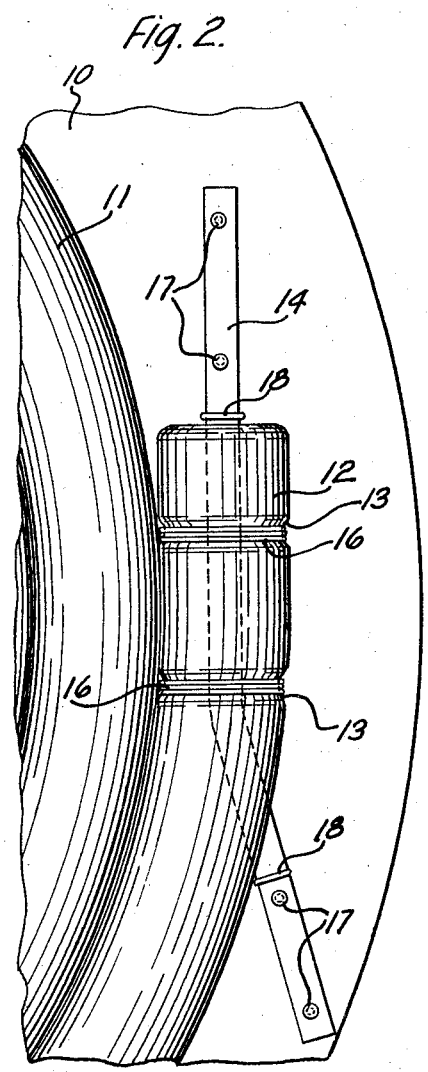
Inventors
James T. Griffin
John P. Deane
James G. Cureton
By H.B. Whitfield Atty.

Patented Apr. 18, 1933

1,904,863

UNITED STATES PATENT OFFICE

JAMES T. GRIFFIN, OF OAK PARK, JOHN P. DEANE, OF BERWYN, AND JAMES G. CURETON, OF CHICAGO, ILLINOIS, ASSIGNORS TO WESTERN ELECTRIC COMPANY, INCORPORATED, OF NEW YORK, N. Y., A CORPORATION OF NEW YORK

DEVICE FOR FASTENING THE END OF A COILED MEMBER TO A SUPPORTING STRUCTURE

Application filed December 6, 1929. Serial No. 412,150.

This invention relates to a device for fastening the end of a coiled member to a supporting structure, and more particularly to a device for fastening the outer end of a coiled lead sheathed cable to a cable reel.

In preparing lead covered cable for shipment, the cable end must necessarily be secured in position in some manner, and in the past, in some instances, this securement has been provided by embedding or sealing a ring within the solder or seal used for enclosing the end of the cable, the ring so embedded being attached by means of a rope or wire to the head of the reel upon which the cable is wound. The practice of employing such a ring secured to the end seal of the cable has been found subject to improvement.

An object of this invention is to provide a simple and efficient device for fastening the end of a member to a supporting structure.

In accordance with this object, one embodiment of the invention comprises a metallic strip or strap member which is corrugated or crimped at spaced positions for engaging strands or binding elements which are wound around the end of a lead sheathed cable in circumferential grooves or recesses formed in the sheath thereof. A plurality of turns of such strands or binding elements are preferably provided in the circumferential grooves and engaging the corrugations of the strap member to afford a rigid or fixed attachment between the cable and the strap member. The strap member or metallic strip is attached to the inner side of a cable drum head or end by means of staples and nails to fasten the cable end securely thereto.

A full and clear understanding of the invention will be had from the following description of one specific embodiment thereof when taken in connection with the accompanying drawing illustrating the same, wherein Fig. 1 is a fragmentary elevational view of one end of a cable reel and cable coiled thereon, taken from the side of the reel, and showing the novel securing structure, and Fig. 2 is a fragmentary elevational view of the same structure, taken from the inside of the cable reel and looking toward the head or end thereof.

Referring now to the drawing in which like reference numerals designate similar parts in the two views, there is disclosed a cable reel having a head or end 10 of wood and a lead covered cable 11 spirally wound thereon and terminating in an outer sealed end 12 which is to be secured to the head 10 by means of the novel structure provided by this invention. The cable end 12 is circumferentially grooved or recessed at spaced positions 13, a metallic strip or strap member 14 is provided which has corrugations or crimped portions 15 which are spaced corresponding to the cable recesses 13, and these corrugated portions 15 are bound to the recessed portions 13 of the cable by means of a plurality of turns of metallic strands or binding elements 16 to maintain the cable end in fixed relation to the strap member 14. The strap member 14 is then firmly secured to the inner surface of the cable reel head 10 preferably by means of nails 17 driven into the head through suitable apertures provided in the strap member, and also by means of staples 18 surrounding the strap member and piercing the head 10. Thus, the nails 17 and staples 18 fixedly secure the strap member 14 to the head, which strap member in turn rigidly engages the binding elements 16, which maintain the cable end 12 in a fixed position with respect to the strap member 14. Thus, it is apparent that the binding elements 16 and the strap member 14, together with its securing nails and staples, provide a fixed attachment of the cable end to the cable reel and an efficient and simple structure for effecting the object of the invention.

It will, of course, be understood that the invention is not to be limited to the specific structure here disclosed and illustrated, but is susceptible to modifications within the scope of the appended claims.

What is claimed is:

1. A device for securing the end of a sheathed cable to its supporting reel, said end being provided with spaced depressions, comprising a member crimped to engage the depressions and interposed between the reel and the cable end, and means for attaching the cable end to the crimped member.

2. A device for securing the end of a cable to its supporting reel, comprising a pair of spaced wires surrounding and recessed within the end of the cable, and a metallic strip crimped for engaging the wires and attaching the cable end to the reel.

3. A device for securing to a reel the end of a cable having spaced peripheral depressions therein, comprising a rigid strap having crimped portions designed to register with the peripheral depressions, means for securing the cable end to the strap, and means for securing the strap to the reel.

4. A device for fastening the outer end of a cable wound on a reel, said end being provided with depressions, comprising means rigidly secured in said depressions in the outer end of the cable, and means extending from said rigidly secured means to the reel to attach the cable end thereto.

In witness whereof, we hereunto subscribe our names this 27th day of November A. D., 1929.

JAMES T. GRIFFIN.
JOHN P. DEANE.
JAMES G. CURETON.